(12) United States Patent
Feng et al.

(10) Patent No.: US 12,342,067 B2
(45) Date of Patent: Jun. 24, 2025

(54) DISPLAY METHOD AND TERMINAL

(71) Applicant: Huawei Technologies Co., Ltd., Shenzhen (CN)

(72) Inventors: Hanyu Feng, Shenzhen (CN); Congchao Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 18/253,636

(22) PCT Filed: Nov. 11, 2021

(86) PCT No.: PCT/CN2021/130129
§ 371 (c)(1),
(2) Date: May 19, 2023

(87) PCT Pub. No.: WO2022/105670
PCT Pub. Date: May 27, 2022

(65) Prior Publication Data
US 2024/0007735 A1  Jan. 4, 2024

(30) Foreign Application Priority Data
Nov. 20, 2020  (CN) .......................... 202011313051.1

(51) Int. Cl.
*H04N 23/63* (2023.01)
*H04N 23/69* (2023.01)
*H04N 23/71* (2023.01)

(52) U.S. Cl.
CPC .......... *H04N 23/632* (2023.01); *H04N 23/69* (2023.01); *H04N 23/71* (2023.01)

(58) Field of Classification Search
CPC ...... H04N 23/632; H04N 23/69; H04N 23/71; H04N 23/45; H04N 23/80; H04N 23/67; H04N 23/70; Y02D 30/70
See application file for complete search history.

(56) References Cited

U.S. PATENT DOCUMENTS

| | | | |
|---|---|---|---|
| 9,894,298 B1* | 2/2018 | Solh | H04N 23/45 |
| 9,924,144 B2* | 3/2018 | Zhao | G03B 15/05 |
| 2006/0050171 A1* | 3/2006 | Lee | H04N 23/70 |
| | | | 348/E5.034 |
| 2009/0015707 A1 | 1/2009 | Hibino et al. | |
| 2009/0322891 A1 | 12/2009 | Kondo et al. | |

(Continued)

FOREIGN PATENT DOCUMENTS

| | | |
|---|---|---|
| CN | 101616260 A | 12/2009 |
| CN | 104104881 A | 10/2014 |

(Continued)

*Primary Examiner* — Chiawei Chen
(74) *Attorney, Agent, or Firm* — Conley Rose, P.C.

(57) ABSTRACT

A display method includes detecting a first operation performed by a user to adjust an angle of view; determining a first angle of view in response to the detected first operation; obtaining a first luminance value of a camera lens at the first angle of view based on the first angle of view; obtaining a second luminance value of the camera lens at a preset second angle of view; fusing the first luminance value and the second luminance value; to obtain a fused luminance value; and displaying a preview image obtained by the camera lens at the first angle of view, where the preview image has the fused luminance value.

20 Claims, 4 Drawing Sheets

(56) References Cited

U.S. PATENT DOCUMENTS

| | | | |
|---|---|---|---|
| 2011/0063446 A1 | 3/2011 | Mcmordie et al. | |
| 2016/0234444 A1 | 8/2016 | Hosono | |
| 2017/0195579 A1* | 7/2017 | Desai | H04N 23/698 |
| 2019/0230269 A1* | 7/2019 | Saito | G08B 13/19617 |
| 2020/0045211 A1 | 2/2020 | Liu et al. | |
| 2020/0162675 A1 | 5/2020 | Yuan | |
| 2021/0314499 A1* | 10/2021 | Han | H04N 23/69 |
| 2021/0368104 A1 | 11/2021 | Bian et al. | |

FOREIGN PATENT DOCUMENTS

| | | |
|---|---|---|
| CN | 104980644 A | 10/2015 |
| CN | 105765965 A | 7/2016 |
| CN | 106911892 A | 6/2017 |
| CN | 107071291 A | 8/2017 |
| CN | 107257437 A | 10/2017 |
| CN | 107343155 A | 11/2017 |
| CN | 107483808 A | 12/2017 |
| CN | 107920188 A | 4/2018 |
| CN | 108702459 A | 10/2018 |
| CN | 108737739 A | 11/2018 |
| CN | 209656980 U | 11/2019 |
| CN | 110855957 A | 2/2020 |
| CN | 111432143 A | 7/2020 |
| CN | 111510618 A | 8/2020 |
| TW | 200906179 A | 2/2009 |

* cited by examiner

DISPLAY METHOD AND TERMINAL

CROSS-REFERENCE TO RELATED APPLICATIONS

This is a National Stage of International Patent Application No. PCT/CN2021/130129 filed on Nov. 11, 2021, which claims priority to Chinese Patent Application No. 202011313051.1 filed on Nov. 20, 2020. Both of the aforementioned applications are hereby incorporated by reference in their entireties.

TECHNICAL FIELD

This application relates to the field of terminal technologies, and in particular, to a display method and a terminal.

BACKGROUND

A zoom function of a camera is increasingly valued, and a multi-camera module is commonly used in a current mobile phone. When a user uses the zoom function, for example, a focal length of a camera lens is zoomed from 1× to 10×, a current image of the camera lens is first zoomed. When a zoom ratio reaches a specific threshold, a system switches the camera lens to another camera lens, to make full use of different features of the multi-camera module.

SUMMARY

This application provides a display method and a terminal. This application further provides a computer-readable storage medium, to provide a display method, so that metering is more stable, and stability of a luminance change of a display image is further improved.

According to a first aspect, this application provides a display method, applied to a terminal. The terminal includes at least one camera lens, and the method includes:
 detecting a first operation performed by a user to adjust an angle of view;
 determining a first angle of view in response to the detected first operation;
 obtaining a first luminance value of the camera lens at the first angle of view based on the first angle of view;
 obtaining a second luminance value of the camera lens at a preset second angle of view;
 fusing the first luminance value and the second luminance value, to obtain a fused luminance value; and
 displaying a preview image obtained by the camera lens at the first angle of view, where the preview image has the fused luminance value.

Further, the camera lens includes a first camera lens and a second camera lens; and the obtaining a first luminance value of the camera lens at the first angle of view includes:
 obtaining a first luminance value of the first camera lens at the first angle of view; and
 the obtaining a second luminance value of the camera lens at a preset second angle of view includes:
 obtaining a second luminance value of the second camera lens at the preset second angle of view.

Further, the camera lens includes a first camera lens; and the obtaining a first luminance value of the camera lens at the first angle of view includes:
 obtaining a first luminance value of the first camera lens at the first angle of view; and
 the obtaining a second luminance value of the camera lens at a preset second angle of view includes:
 obtaining a second luminance value of the first camera lens at the preset second angle of view.

Further, the fusing the first luminance value and the second luminance value, to obtain a fused luminance value includes:
 obtaining a difference between the first luminance value and the second luminance value;
 determining whether the difference is greater than a first threshold; and
 if the difference is less than or equal to the first threshold, using the second luminance value as the fused luminance value;
 if the difference is greater than the first threshold, and the first luminance value is less than the second luminance value, adding a first difference to the first luminance value, to obtain the fused luminance value; or
 if the difference is greater than the first threshold, and the first luminance value is greater than the second luminance value, subtracting a second difference from the first luminance value, to obtain the fused luminance value, where
 the first difference and the second difference are determined based on the second luminance value.

Further, the second luminance value is obtained by the camera lens at an angle of view of one time the focal length.

According to a second aspect, this application provides a terminal, including a processor and a storage device. The storage device stores an application program; and when the application program is run by the processor, the terminal is enabled to perform the following steps:
 detecting a first operation performed by a user to adjust an angle of view;
 determining a first angle of view in response to the detected first operation;
 obtaining a first luminance value of a camera lens at the first angle of view based on the first angle of view;
 obtaining a second luminance value of the camera lens at a preset second angle of view;
 fusing the first luminance value and the second luminance value, to obtain a fused luminance value; and
 displaying a preview image obtained by the camera lens at the first angle of view, where the preview image has the fused luminance value.

Further, the camera lens includes a first camera lens and a second camera lens; when the application program is run by the processor, the terminal is enabled to perform the step of obtaining a first luminance value of a camera lens at the first angle of view, where the step includes the following step:
 obtaining a first luminance value of the first camera lens at the first angle of view; and
 when the application program is run by the processor, the terminal is enabled to perform the step of obtaining a second luminance value of the camera lens at a preset second angle of view, where the step includes the following step:
 obtaining a second luminance value of the second camera lens at the preset second angle of view.

Further, the camera lens includes a first camera lens; when the application program is run by the processor, the terminal is enabled to perform the step of obtaining a first luminance value of a camera lens at the first angle of view, where the step includes the following step:
 obtaining a first luminance value of the first camera lens at the first angle of view; and
 when the application program is run by the processor, the terminal is enabled to perform the step of obtaining a second luminance value of the camera lens at a preset second angle of view, where the step includes the following step:

obtaining a second luminance value of the first camera lens at the preset second angle of view.

Further, when the application program is run by the processor, the terminal is enabled to perform the step of fusing the first luminance value and the second luminance value, to obtain a fused luminance value, where the step includes the following steps:

obtaining a difference between the first luminance value and the second luminance value;

determining whether the difference is greater than a first threshold; and if the difference is less than or equal to the first threshold, using the second luminance value as the fused luminance value;

if the difference is greater than the first threshold, and the first luminance value is less than the second luminance value, adding a first difference to the first luminance value, to obtain the fused luminance value; or if the difference is greater than the first threshold, and the first luminance value is greater than the second luminance value, subtracting a second difference from the first luminance value, to obtain the fused luminance value, where the first difference and the second difference are determined based on the second luminance value.

Further, the second luminance value is obtained by the camera lens at an angle of view of one time the focal length.

According to a fourth aspect, this application provides a display apparatus, including:

a detection module, configured to detect a first operation performed by a user to adjust an angle of view;

a response module, configured to determine a first angle of view in response to the detected first operation;

a first obtaining module, configured to obtain a first luminance value of a camera lens at the first angle of view based on the first angle of view;

a second obtaining module, configured to obtain a second luminance value of the camera lens at a preset second angle of view;

a fusion module, configured to fuse the first luminance value and the second luminance value, to obtain a fused luminance value; and a display module, configured to display a preview image obtained by the camera lens at the first angle of view, where the preview image has the fused luminance value.

Further, the camera lens includes a first camera lens and a second camera lens; the first obtaining module is further configured to obtain a first luminance value of the first camera lens at the first angle of view; and the second obtaining module is further configured to obtain a second luminance value of the second camera lens at the preset second angle of view.

Further, the camera lens includes a first camera lens; the first obtaining module is further configured to obtain a first luminance value of the first camera lens at the first angle of view; and the second obtaining module is further configured to obtain a second luminance value of the first camera lens at the preset second angle of view.

Further, the fusion module is configured to:

obtain a difference between the first luminance value and the second luminance value;

determine whether the difference is greater than a first threshold; and if the difference is less than or equal to the first threshold, use the second luminance value as the fused luminance value;

if the difference is greater than the first threshold, and the first luminance value is less than the second luminance value, add a first difference to the first luminance value, to obtain the fused luminance value; or if the difference is greater than the first threshold, and the first luminance value is greater than the second luminance value, subtract a second difference from the first luminance value, to obtain the fused luminance value, where the first difference and the second difference are determined based on the second luminance value. Further, the second luminance value is obtained by the camera lens at an angle of view of one time the focal length.

According to a fourth aspect, this application provides a computer-readable storage medium. The computer-readable storage medium stores a computer program; and when the computer program is run on a computer, the computer is enabled to perform the method according to the first aspect.

According to a fifth aspect, this application provides a computer program, where when the computer program is executed by a computer, the computer program is used to perform the method according to the first aspect.

In a possible design, the program in the fourth aspect may be all or partially stored in a storage medium packaged with a processor, or may be all or partially stored in a memory that is not packaged with the processor.

DESCRIPTION OF EMBODIMENTS

The following describes the technical solutions in embodiments of this application with reference to the accompanying drawings in embodiments of this application. In descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases. Only A exists, both A and B exist, and only B exists.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this application, unless otherwise specified, "a plurality of" means two or more than two.

A zoom function of a camera is increasingly valued, and a multi-camera module is commonly used in a current mobile phone. When a user uses the zoom function, for example, a focal length of a camera lens is zoomed from 1× to 10×, a current image of the camera lens is first zoomed. When a zoom ratio reaches a specific threshold, a system switches the camera lens to another camera lens, to make full use of different features of the multi-camera module.

However, the inventor finds that, when a camera lens of a terminal is photographing an image, because luminance of angles of view corresponding to different focal lengths of the camera lens is different, when the user performs a zoom operation on the camera lens of the terminal, metering is unstable, and consequently image luminance continuously changes. For example, when a camera lens photographs one object, luminance at an angle of view corresponding to a focal length of 1× is different from luminance at an angle of view corresponding to a focal length of 10×.

Figure 1:
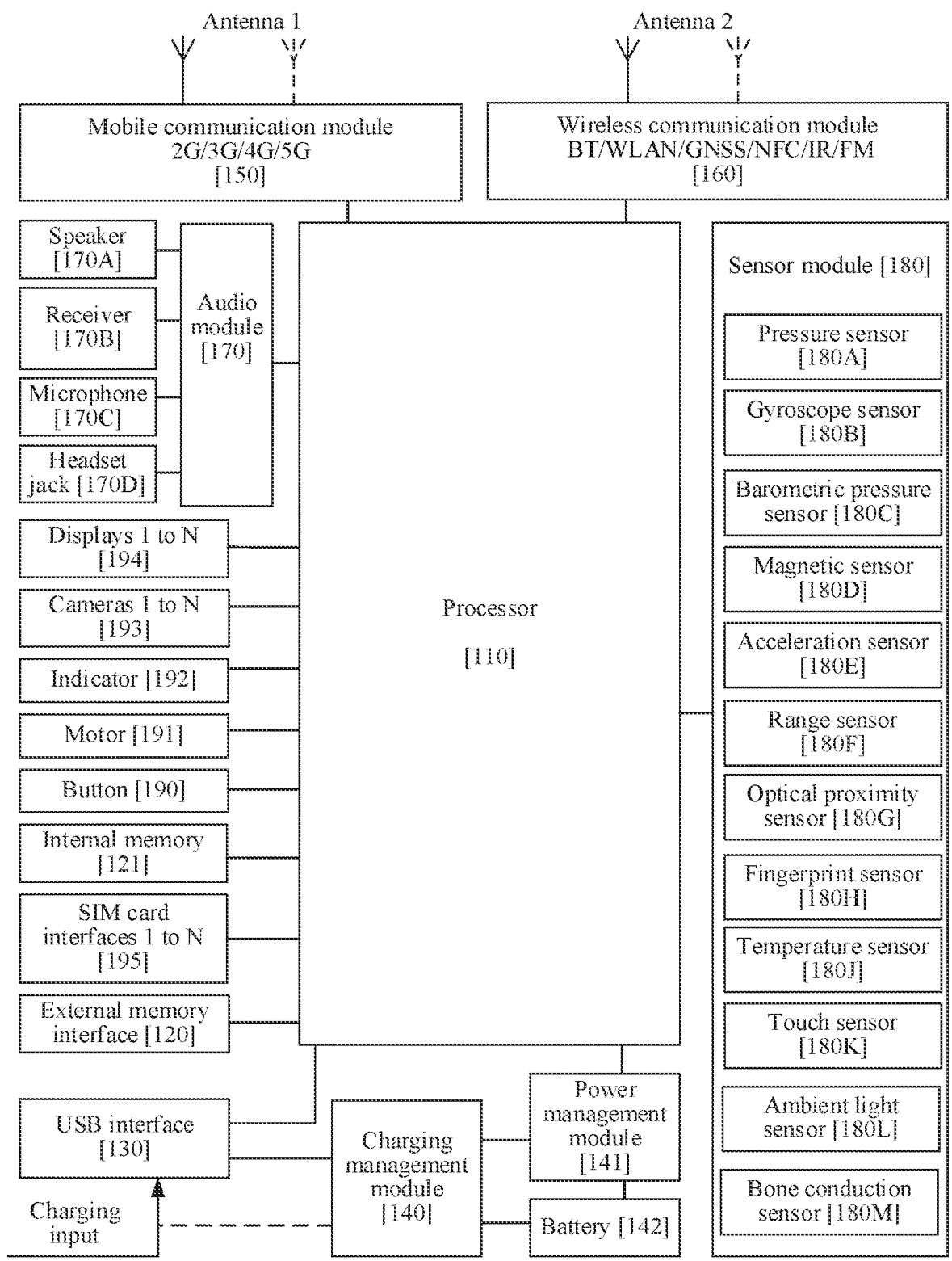
FIG. 1 is a schematic diagram of a structure of a terminal 100 according to an embodiment of this application.

FIG. 1 is a schematic diagram of a structure of a terminal 100.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SC). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transfer an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transfer an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the terminal 100, or may be configured to transmit data between the terminal 100 and a peripheral device, or may be configured to connect to a headset for playing audio through the headset. The interface may be further configured to connect to another terminal, for example, an AR device.

It may be understood that an interface connection relationship between the modules shown in this embodiment of the present invention is merely an example for description, and does not constitute a limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the terminal 100. When charging the battery 142, the charging management module 140 may further supply power to the terminal by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the terminal 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution applied to the terminal 100, including 2G, 3G, 4G, 5G, or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same component as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transferred to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that is applied to the terminal 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module.

The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal 100 is coupled to the mobile communication module 150, and the antenna 2 is coupled to the wireless communication module 160, so that the terminal 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system. GLONASS), a BeiDou navigation satellite system (BeiDou navigation satellite system. BDS), a quasi-zenith satellite system (quasi-zenith satellite system. QZSS), and/or a satellite based augmentation system (satellite based augmentation system, SBAS). It should be noted that a quantity of antennas shown in the figure is merely an example, and more antennas may be set, for example, three, four, or more.

The terminal 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the terminal 100 may include one or N displays 194, where N is a positive integer greater than 1.

The terminal 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transferred to a photosensitive element of the camera lens through a lens. An optical signal is converted into an electrical signal, and the photosensitive element of the camera lens transfers the electrical signal to the ISP for processing, to convert the electrical signal into a visible image. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may further process another digital signal in addition to the digital image signal. For example, when the terminal 100 selects a frequency, the digital signal processor is configured to perform Fourier transformation on frequency energy.

The video codec is configured to compress or decompress a digital video. The terminal 100 may support one or more video codecs. In this way, the terminal 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the terminal 100 may be implemented through the NPU, for example, image recognition, facial recognition, voice recognition, and text understanding.

The external memory interface 120 may be used to connect to an external memory card, for example, a micro SD card, to extend a storage capability of the terminal 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data and a phone book) and the like created when the terminal 100 is used. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the terminal 100.

The terminal 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal 100 may be used to listen to music or answer a call in a hands-free mode over the speaker 170A.

The receiver 170B, also referred to as an "earpiece", is configured to convert an audio electrical signal into a sound signal. When a call is answered or a voice message is received through the terminal 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a change in the capacitance. When a touch operation is performed on the display 194, the terminal 100 detects touch operation intensity by using the pressure sensor 180A. The terminal 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to a first pressure threshold is performed on an SMS message application icon, an instruction for creating a new SMS message is performed.

The gyroscope sensor 180B may be configured to determine a motion posture of the terminal 100. In some embodiments, an angular velocity of the terminal 100 around three axes (namely, axes x, y, and z) may be determined by using the gyroscope sensor 180B. The gyroscope sensor 180B may be configured to implement image stabilization during photographing. For example, when a shutter is pressed, the gyroscope sensor 180B detects an angle at which the terminal 100 jitters, calculates, based on the angle, a range for which a lens module needs to compensate, and allows a lens to cancel the jitter of the terminal 100 through reverse motion, to implement the image stabilization. The gyroscope sensor 180B may also be used in a navigation scenario and a somatic game scenario.

The barometric pressure sensor 180C is configured to measure barometric pressure. In some embodiments, the terminal 100 calculates an altitude based on a barometric pressure value measured by the barometric pressure sensor 180C, to assist in positioning and navigation.

The magnetic sensor 180D includes a Hall sensor. The terminal 100 may detect opening and closing of a flip cover by using the magnetic sensor 180D. In some embodiments, when the terminal 100 is a clamshell phone, the terminal 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitudes of accelerations of the terminal 100 in various directions (usually on three axes). A magnitude and a direction of gravity may be detected when the terminal 100 is still. The acceleration sensor 180E may be further configured to identify a posture of the terminal, and is applied to an application such as switching between a landscape mode and a portrait mode or a pedometer.

The range sensor 180F is configured to measure a range. The terminal 100 may measure a range in an infrared manner or a laser manner. In some embodiments, in a photographing scenario, the terminal 100 may measure a range by using the range sensor 180F to implement quick focusing.

The optical proximity sensor 180G may include, for example, a light emitting diode (LED) and an optical detector, for example, a photodiode. The light emitting diode may be an infrared light emitting diode. The terminal 100 transmits infrared light by using the light emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light luminance. The terminal 100 may adaptively adjust luminance of the display 194 based on the sensed ambient light luminance. The ambient light sensor 180L may also be configured to automatically adjust white balance during photographing. The ambient light sensor 180L may further cooperate with the optical proximity sensor 180G to detect whether the terminal 100 is in a pocket, to avoid an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor located near the temperature sensor 1803, to reduce power consumption for thermal protection. In some other embodiments, when the temperature is lower than another threshold, the terminal 100 heats the battery 142 to avoid abnormal shutdown of the terminal 100 due to a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external storage card. The terminal 100 interacts with a network through the SIM card, to implement functions such as calling and data communication. In some embodiments, the terminal 100 uses an eSIM, namely, an embedded SIM card. The eSIM card may be embedded in the terminal 100, and cannot be separated from the terminal 100.

Figure 2:
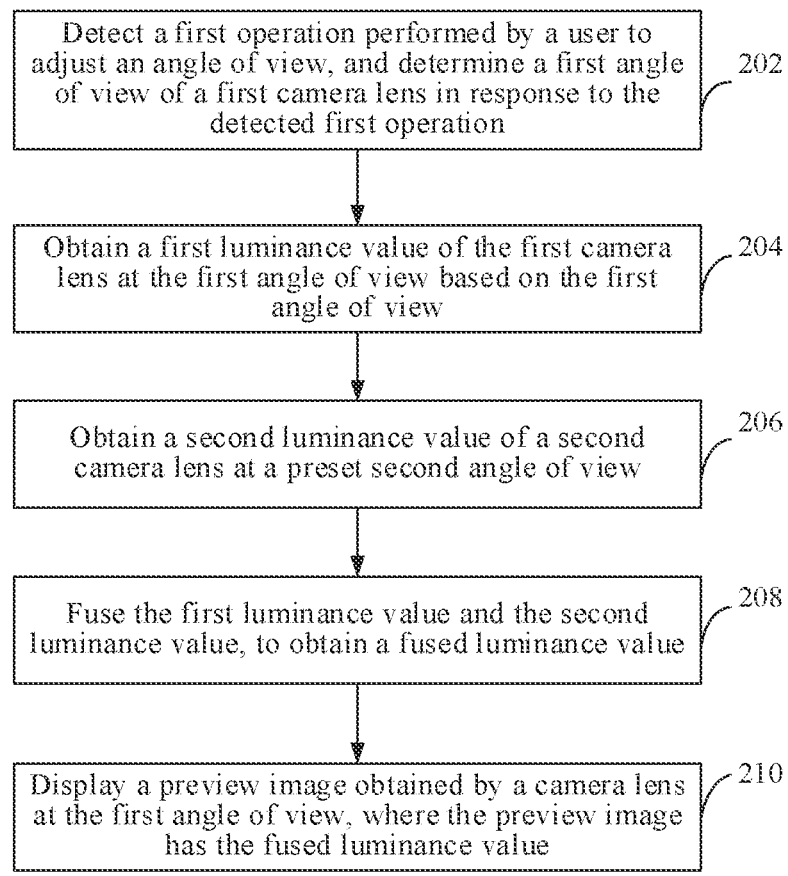
FIG. 2 is a flowchart of a display method according to an embodiment of this application.

FIG. 2 is specifically a flowchart of an embodiment of a display method according to this application. The method may be applied to the foregoing terminal 100. The method specifically includes the following steps.

Step 202: The terminal detects a first operation performed by a user to adjust an angle of view, and determines a first angle of view of a first camera lens in response to the detected first operation.

In an embodiment, the terminal includes but is not limited to a terminal such as a notebook computer, a tablet computer, a smartphone, and a smart household appliance. The terminal includes at least one camera lens, for example, one, two, three, or four camera lenses.

In an example, the terminal may include a wide-angle camera lens, a primary camera lens, and a long-focus camera lens. The camera lenses may work in different focal length ranges. For example, the wide-angle camera lens works at focal lengths of 0.6× to 1×, the primary camera lens works at focal lengths of 1× to 3×, and the long-focus camera lens works at focal lengths greater than 3×. The user may adjust an angle of view of the camera lens of the terminal by adjusting the focal length. When the terminal detects the action performed by the user to adjust the angle of view of the terminal, the camera lenses of the terminal may be switched between each other based on the respective focal length ranges in which the camera lenses work.

In another example, the terminal device may include only a wide-angle camera lens and a long-focus camera lens. The camera lenses may work in different focal length ranges. For example, the wide-angle camera lens works at focal lengths of 0.6× to 3×, and the long-focus camera lens works at focal lengths greater than 3×. The user may adjust an angle of view of the camera lens by adjusting a focal length of a user interface of the terminal. When the terminal detects the action performed by the user to adjust the angle of view of the terminal, the camera lenses of the terminal may be switched between each other based on the respective focal length ranges in which the camera lenses work.

It should be noted that, the camera lenses of the terminal include a display camera lens. The display camera lens is a camera lens that displays, on the user interface of the terminal, an image obtained by the display camera lens, and the image displayed on the user interface is referred to as a display image. The display camera lens may be switched based on the action performed by the user to adjust the focal length of the camera lens. Specifically, for example, the terminal device includes a wide-angle camera lens, a primary camera lens, and a long-focus camera lens. The wide-angle camera lens works at focal lengths of 0.6× to 1×, the primary camera lens works at focal lengths of 1× to 3×, and the long-focus camera lens works at focal lengths greater than 3×. Assuming that a focal length at which the display camera lens of the terminal works is 10×, the display camera lens is the long-focus camera lens. When the user adjusts the focal length to 0.8×, the display camera lens is switched from the long-focus camera lens to the wide-angle camera lens.

The first camera lens shown in step 202 corresponds to the display camera lens, and the first angle of view is the angle of view corresponding to the first camera lens, namely, a corresponding angle of view when the display camera lens displays the obtained image. A value of the first angle of view of the first camera lens of the terminal corresponds to a value of a focal length at which the first camera lens works. When detecting the operation performed by the user to adjust the focal length, the terminal may determine the first angle of view of the first camera lens based on the focal length at which the first camera lens works.

Figure 5A:
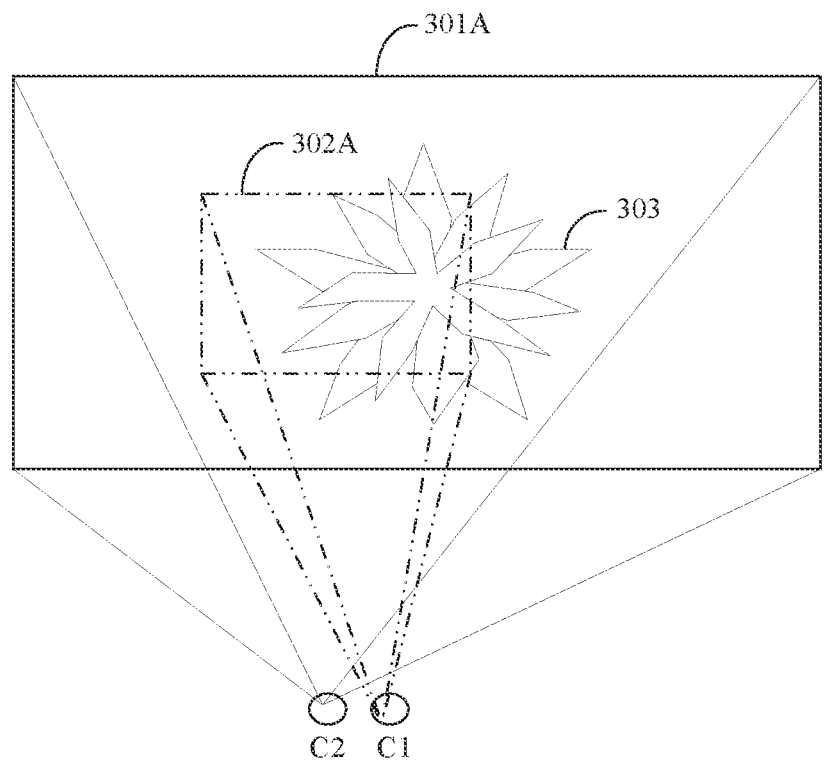
FIG. 5A and FIG. 5B each are a schematic diagram in which a display camera lens of a terminal displays an obtained image according to an embodiment of this application.
Figure 5B:
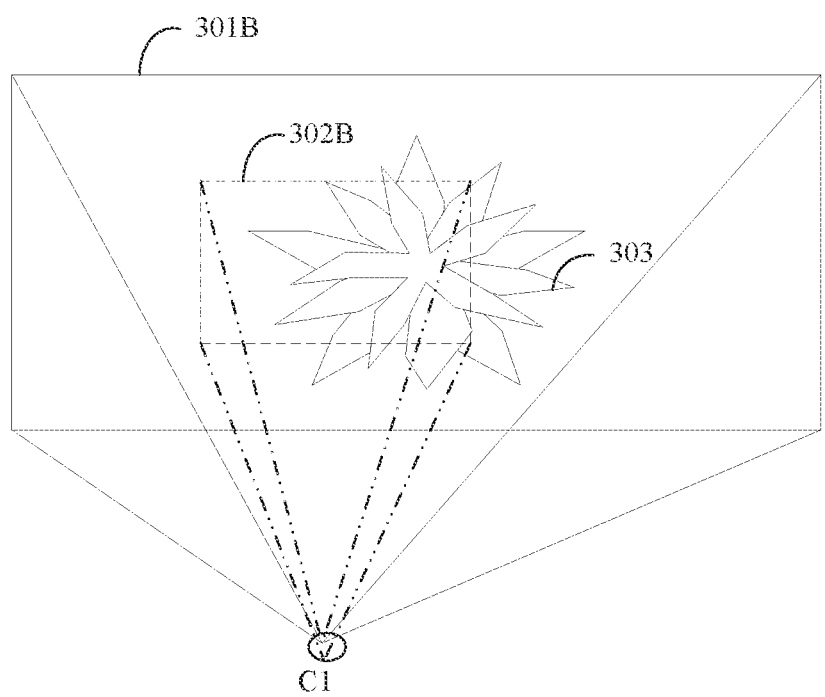

Refer to FIG. 5A and FIG. 5B. The display camera lens is further explained and described. FIG. 5A is specifically a schematic diagram in which a display camera lens of a terminal displays an obtained image according to an embodiment of this application. FIG. 5B is a schematic diagram in which a display camera lens of a terminal displays an obtained image according to another embodiment of this application.

Refer to FIG. 5A The terminal shown in FIG. 5A includes a first camera lens C1 and a second camera lens C2, where the first camera lens is a display camera lens. The first camera lens C1 and the second camera lens C2 may work simultaneously. It can be learned from FIG. 5A that an angle of view of the second camera lens C2 is greater than an angle of view of the first camera lens C1, and the angles of view of the two camera lenses partially overlap. Specifically, the first camera lens C1 and the second camera lens C2 are simultaneously turned on and point to a target object 303. The terminal may simultaneously obtain luminance of the first camera lens C1 at a first angle of view when the first camera lens C1 displays an image and luminance of the second camera lens C2 at a preset second angle of view, where the preset second angle of view indicates an angle of view of the second camera lens C2 at a preset focal length. Because the first camera lens C1 is the display camera lens, a first image 302A obtained by the first camera lens C1 is an image to be displayed to a user. A second image 301A is an image obtained by the second camera lens at the preset second angle of view. In an example, assuming that the first camera lens C1 is a long-focus camera lens, and the second camera lens C2 is a primary camera lens, the preset second angle of view is an angle of view of the primary camera lens at a focal length of 1×. In this example, the long-focus camera lens is the display camera lens, in other words, the first image 302A obtained by the long-focus camera lens is the image to be displayed to the user.

Refer to FIG. 5B. In another embodiment, the terminal includes a first camera lens C1, where the first camera lens C1 is a display camera lens. It should be noted that luminance of angles of view of images obtained by the first camera lens at angles of view corresponding to different focal lengths may be different, and the terminal may simultaneously obtain luminance of the first camera lens at a first angle of view and luminance of the first camera lens at a preset second angle of view. For example, the camera lens photographs a target object 303. A first image 302B is an image obtained by the camera lens at an angle of view of displaying the image, and a second image 301B is an image obtained by the camera lens at the preset second angle of view. In an embodiment, the first camera lens C1 is a primary camera lens, and the preset second angle of view is an angle of view of the primary camera lens at a focal length of 1×.

Step 204: The terminal obtains a first luminance value of the first camera lens at the first angle of view based on the first angle of view, where the first luminance value is a luminance value at a corresponding angle of view when the first camera lens performs displaying.

After determining the first angle of view, the terminal may obtain the first luminance value of the first camera lens at the first angle of view. As shown above, the first angle of view is an angle of view corresponding to the display camera lens. Light at the first angle of view is transferred to a photosensitive element of the first camera lens by using a lens of the first camera lens. The first camera lens converts the received light into an optical signal by using the photosensitive element, and converts the optical signal into an electrical signal. Then, the photosensitive element of the first camera lens transfers the electrical signal to an ISP for processing, and obtains the first luminance value.

Step 206: The terminal obtains a second luminance value of the second camera lens at the preset second angle of view, where the preset second angle of view is the angle of view of the second camera lens at the preset focal length.

The terminal may simultaneously obtain the first luminance value of the first camera lens at the first angle of view and the second luminance value of the second camera lens at the preset second angle of view. Light of the second camera lens at the preset second angle of view is transferred to a photosensitive element of the second camera lens by using a lens of the second camera lens. The photosensitive element of the second camera lens converts an optical signal into an electrical signal, transfers the electrical signal to the ISP for processing, and then obtains the second luminance value.

In another embodiment, the terminal may simultaneously obtain the first luminance value of the first camera lens at the first angle of view and the second luminance value of the first camera lens at the preset second angle of view, where the preset second angle of view is an angle of view of the first camera lens at the preset focal length. When the first camera lens displays an image, light is transferred to an entire photosensitive element of the camera lens by using a lens of the first camera lens. The photosensitive element collects a pixel at the first angle of view and a pixel at the preset second angle of view, converts, into a first electrical signal, an optical signal corresponding to the pixel at the first angle of view, and converts, into a second electrical signal, an optical signal corresponding to the pixel at the preset second angle of view. The photosensitive element of the camera lens transfers, to the ISP for processing, the first electrical signal corresponding to the pixel at the first angle of view and the electrical signal corresponding to the second pixel at the preset second angle of view, to obtain the first luminance value at the first angle of view and the second luminance value at the preset second angle of view.

Step 208: The terminal fuses the first luminance value and the second luminance value, to obtain a fused luminance value.

In an embodiment, the terminal may fuse the obtained first luminance value and the obtained second luminance value, to obtain the fused luminance value, where the fused luminance value is used to display the display image obtained by the first camera lens.

Step 210: The terminal displays a preview image obtained by the camera lens at the first angle of view, where the preview image has the fused luminance value.

According to the display method provided in this application, the fused luminance value is used as luminance of the display image, to avoid unstable metering of the camera lens.

Figure 3:
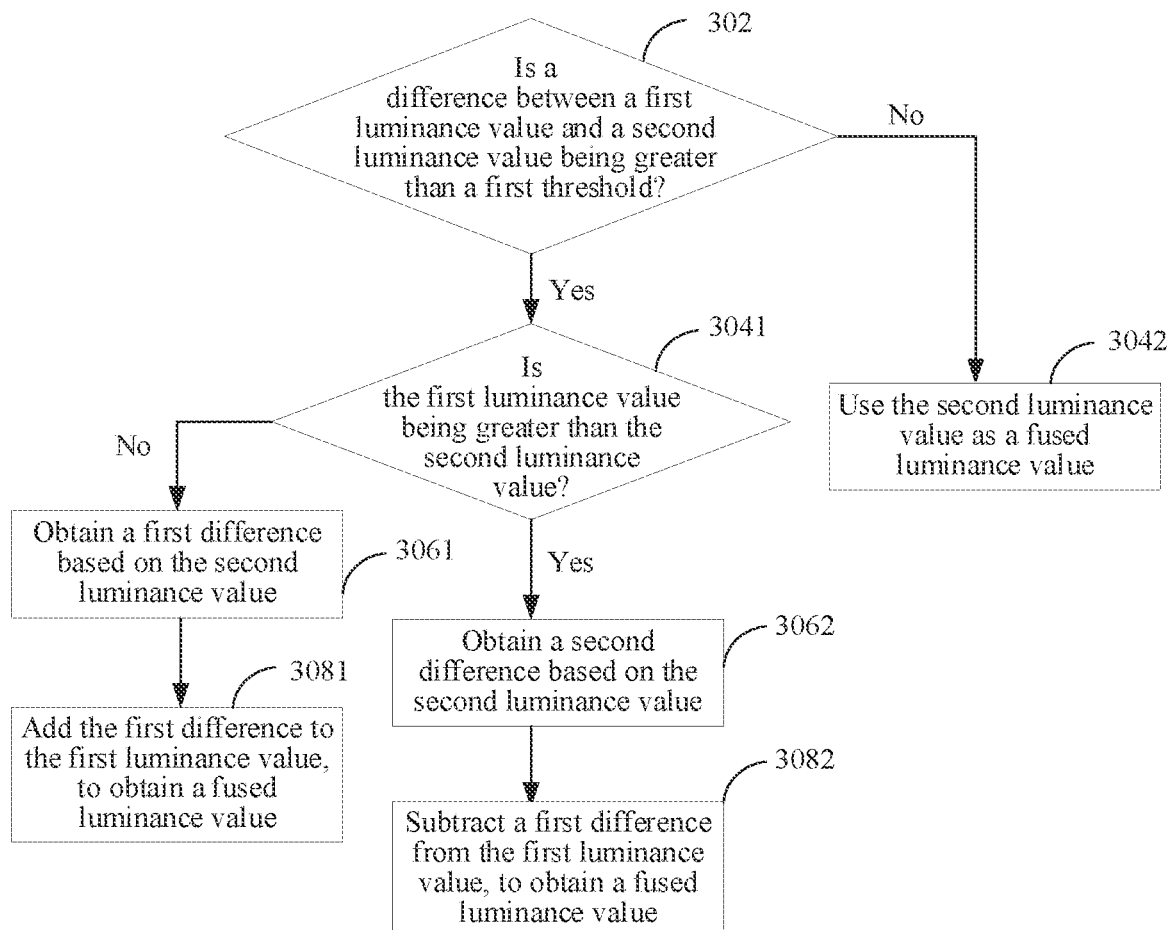
FIG. 3 is a flowchart of a method for obtaining a fused luminance value according to an embodiment of this application.

FIG. 3 is specifically a flowchart of a method for obtaining a fused luminance value according to an embodiment of this application.

Step 302: A terminal determines whether a difference between a first luminance value and a second luminance value is greater than a first threshold. Specifically, the first threshold indicates a value of the difference between the first luminance value and the second luminance value. If the difference is greater than the first threshold, it indicates that a light luminance difference between the first luminance value and the second luminance value is large; or if the difference is less than the first threshold, it indicates that a luminance difference between the first luminance value and the second luminance value is small. It should be noted that the first threshold is a preset threshold, and a value of the first threshold may be set according to a requirement.

As shown above, the first luminance value is luminance of a first camera lens at a first angle of view, and the second luminance value is a luminance value of a second camera lens at a preset second angle of view, or the second luminance value is a luminance value of the first camera lens at the preset second angle of view. It can be learned from the foregoing description that images at the first angle of view and the preset second angle of view partially overlap. Because the luminance difference between the first luminance value and the second luminance value is large, when a user adjusts an angle of view, the terminal may probably cause unstable metering.

In an embodiment, if the difference between the first luminance value and the second luminance value is less than or equal to the first threshold (step 3042), that is, the luminance difference between the first luminance value and the second luminance value is small, the terminal may directly use the second luminance value as the fused luminance value, in other words, display, by using the second luminance value, an image obtained by the first camera lens. In this embodiment, because the second luminance value is the luminance value at the preset second angle of view, and the preset second angle of view is an angle of view at a preset focal length, the second luminance value is more stable. The first angle of view changes with the action performed by the user to adjust the angle of view, and the first luminance value may also change. When the luminance difference between the first luminance value and the second luminance value is small, directly using the second luminance value as the fused luminance value makes metering more stable.

Figure 4:
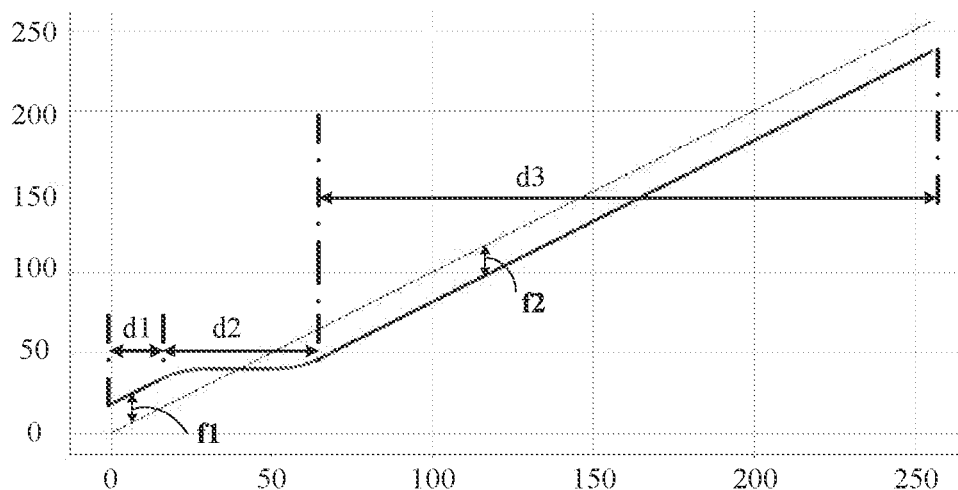
FIG. 4 is a linear diagram of a fused luminance value obtained by fusing a first luminance value and a second luminance value according to an embodiment of this application.

FIG. 4 is specifically a linear diagram of a fused luminance value obtained by fusing a first luminance value and a second luminance value according to an embodiment of this application.

As shown in FIG. 4, a dashed line indicates display luminance of a display image, where the first luminance value is directly used as the display luminance, in other words, indicates luminance of the display image when the first luminance value and the second luminance value are not fused, and a solid line indicates display luminance of the display image, where the fused luminance value is used as the display luminance according to an embodiment of this application.

For example, in the dashed line in FIG. 4, when the first luminance value is used as the display luminance of the display image, a value of the second luminance value of the second camera lens at the preset second angle of view is 40; or a value of the second luminance value of the first camera lens at a preset second angle of view is 40. In FIG. 4, an intersection point of the dashed line and the solid line indicates a specific value of the second luminance value.

In step 302, if the difference between the first luminance value and the second luminance value is less than or equal to the first threshold, the terminal may directly use the second luminance value as the fused luminance value. For details, refer to a second part d2 in FIG. 4.

Step 304: If the difference between the first luminance value and the second luminance value is greater than the first threshold, and the first luminance value is greater than the second luminance value, obtain a second difference (step 3062), where the second difference is used to obtain the fused luminance value based on the first luminance value. It should be noted that the second difference may be set based on the value of the second luminance value. For example, each second luminance value may be set, according to a requirement, to correspond to one second difference.

It can be learned from the foregoing description that images at the first angle of view and the preset second angle of view partially overlap. Because the luminance difference between the first luminance value and the second luminance value is large, when the user adjusts the angle of view, the terminal may probably cause unstable metering. In this application, in the case shown in step 304, to avoid an excessively large luminance jump of a display image, the second difference may be subtracted from the first luminance value, to obtain the fused luminance value. The display image is displayed based on the fused luminance value, to avoid unstable metering when the first luminance value is directly used to display the display image.

Refer to a third part d3 in FIG. 4. A difference between the first luminance value corresponding to the dashed line and the fused luminance value corresponding to the solid line indicates a second difference f2. In this case, in this application, the first luminance value minus the second difference is used as the fused luminance value (step 3082), and the fused luminance value is used as the luminance of the display image, so that metering is more stable.

Step 3061: If the difference between the first luminance value and the second luminance value is greater than the first threshold, and the first luminance value is less than the second luminance value, obtain a first difference, where the first difference is used to obtain the fused luminance value based on the first luminance value. Specifically, the first difference is used to compensate for the first luminance value. It should be noted that the first difference f1 may be set based on the value of the second luminance value. Specifically, each first luminance value may be set, according to a requirement, to correspond to one first difference.

It can be learned from the foregoing description that images at the first angle of view and the preset second angle of view partially overlap. Because the luminance difference between the first luminance value and the second luminance value is large, when the user adjusts the angle of view, the terminal may probably cause unstable metering. In this application, to avoid an excessively large luminance jump of the display image and unstable metering, the first difference may be added to the first luminance value, to obtain the fused luminance value (step 3081). The display image is displayed based on the fused luminance value, to avoid unstable metering caused by the excessively large luminance jump generated when the display image is directly displayed by using the first luminance value.

Refer to FIG. 4. In a first part d1, the difference between the first luminance value corresponding to the dashed line and the fused luminance value corresponding to the solid line indicates the first difference f1. In the first part d1 of the solid line, when the difference between the first luminance value and the second luminance value is large, and the first luminance value is less than the second luminance value, in the solution disclosed in this application, the first luminance value plus the first difference f1 is used as the fused luminance value, and the fused luminance value is used as the luminance of the display image. In this way, unstable camera lens metering can be avoided.

It may be understood that the method for obtaining the fused luminance value shown in this embodiment of this application is merely an example, and there may be another method for obtaining the fused luminance value by fusing the first luminance value and the second luminance value. Details are not described herein again.

In embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that in embodiments of the present invention, module division is an example, and is merely logical function division. During actual implementation, another division manner may be used.

The foregoing descriptions about implementations allow a person skilled in the art to understand that, for the purpose of convenient and brief description, division of the foregoing functional modules is taken as an example for illustration. During actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display method implemented by a terminal, wherein the terminal comprises a camera lens, and wherein the display method comprises:
    detecting a first operation performed by a user to adjust an angle of view;
    determining a first angle of view in response to the first operation;
    obtaining a first luminance value of the camera lens at the first angle of view;
    obtaining a second luminance value of the camera lens at a preset second angle of view;
    fusing the first luminance value and the second luminance value to obtain a fused luminance value;
    obtaining a preview image by the camera lens at the first angle of view, wherein the preview image has the fused luminance value; and
    displaying the preview image.

2. The display method of claim 1, wherein the camera lens comprises a first camera lens and a second camera lens, wherein obtaining the first luminance value comprises obtaining the first luminance value of the first camera lens at the first angle of view, and wherein obtaining the second luminance value comprises obtaining the second luminance value of the second camera lens at the preset second angle of view.

3. The display method of claim 2, wherein the first camera lens is a long-focus camera lens, and wherein the second camera lens is a primary camera lens.

4. The display method of claim 1, wherein the camera lens comprises a first camera lens, wherein obtaining the first luminance value comprises obtaining the first luminance value of the first camera lens at the first angle of view, and wherein obtaining the second luminance value comprises obtaining the second luminance value of the first camera lens at the preset second angle of view.

5. The display method of claim 1, wherein fusing the first luminance value and the second luminance value comprises:
    obtaining a first difference between the first luminance value and the second luminance value;
    determining whether the first difference is greater than a first threshold;
    using the second luminance value as the fused luminance value when the first difference is less than or equal to the first threshold; and
    adding a second difference to the first luminance value to obtain the fused luminance value when the first difference is greater than the first threshold and when the first luminance value is less than the second luminance value, wherein the second difference is based on the second luminance value.

6. The display method of claim 1, further comprising obtaining the second luminance value at the preset second angle of view, wherein the preset second angle of view is one time a focal length of the camera lens.

7. The display method of claim 1, wherein fusing the first luminance value and the second luminance value comprises:
   obtaining a first difference between the first luminance value and the second luminance value;
   determining whether the first difference is greater than a first threshold;
   using the second luminance value as the fused luminance value when the first difference is less than or equal to the first threshold; and
   subtracting a second difference from the first luminance value to obtain the fused luminance value when the first luminance value is greater than the second luminance value and when the first difference is greater than the first threshold, wherein the second difference is based on the second luminance value.

8. A terminal, comprising:
   a camera lens, and
   one or more processors coupled to the camera lens and configured to:
      detect a first operation performed by a user to adjust an angle of view;
      determine a first angle of view in response to the first operation;
      obtain a first luminance value of the camera lens at the first angle of view;
      obtain a second luminance value of the camera lens at a preset second angle of view;
      fuse the first luminance value and the second luminance value to obtain a fused luminance value;
      obtain a preview image by the camera lens at the first angle of view, wherein the preview image has the fused luminance value; and
      display the preview image.

9. The terminal of claim 8, wherein the camera lens comprises a first camera lens and a second camera lens, and wherein the one or more processors are further configured to:
   obtain the first luminance value of the first camera lens at the first angle of view; and
   obtain the second luminance value of the second camera lens at the preset second angle of view.

10. The terminal of claim 9, wherein the one or more processors are further configured to obtain the second luminance value at the preset second angle of view, and wherein the preset second angle of view is one time a focal length of the camera lens.

11. The terminal of claim 8, wherein the camera lens comprises a first camera lens, and wherein the one or more processors are further configured to:
   obtain the first luminance value of the first camera lens at the first angle of view; and
   obtain the second luminance value of the first camera lens at the preset second angle of view.

12. The terminal of claim 8, wherein the one or more processors are further configured to:
   obtain a first difference between the first luminance value and the second luminance value;
   determine whether the first difference is greater than a first threshold;
   use the second luminance value as the fused luminance value when the first difference is less than or equal to the first threshold; and
   add a second difference to the first luminance value to obtain the fused luminance value when the difference is greater than the first threshold and when the first luminance value is less than the second luminance value, wherein the second difference is based on the second luminance value.

13. The terminal of claim 8, wherein the one or more processors are further configured to:
   obtain a first difference between the first luminance value and the second luminance value;
   determine whether the first difference is greater than a first threshold;
   use the second luminance value as the fused luminance value when the first difference is less than or equal to the first threshold; and
   subtract a second difference from the first luminance value to obtain the fused luminance value when the difference is greater than the first threshold and when the first luminance value is greater than the second luminance value, wherein the second difference is based on the second luminance value.

14. A computer program product comprising computer-executable instructions that are stored on a non-transitory computer-readable storage medium and that, when executed by one or more processors, cause a terminal to:
   detect a first operation performed by a user to adjust an angle of view;
   determine a first angle of view in response to the first operation;
   obtain a first luminance value of a camera lens at the first angle of view;
   obtain a second luminance value of the camera lens at a preset second angle of view;
   fuse the first luminance value and the second luminance value to obtain a fused luminance value;
   obtain a preview image by the camera lens at the first angle of view, wherein the preview image has the fused luminance value; and
   display the preview image.

15. The computer program product of claim 14, wherein the camera lens comprises a first camera lens and a second camera lens, and wherein the instructions, when executed by the one or more processors, further cause the terminal to:
   obtain the first luminance value of the first camera lens at the first angle of view; and
   obtain the second luminance value of the second camera lens at the preset second angle of view.

16. The computer program product of claim 15, wherein the first camera lens is a long-focus camera lens, and wherein the second camera lens is a primary camera lens.

17. The computer program product of claim 14, wherein the camera lens comprises a first camera lens, and wherein the instructions, when executed by the one or more processors, further cause the terminal to:
   obtain the first luminance value of the first camera lens at the first angle of view; and
   obtain the second luminance value of the first camera lens at the preset second angle of view.

18. The computer program product of claim 14, wherein the instructions, when executed by the one or more processors, further cause the terminal to:
   obtain a first difference between the first luminance value and the second luminance value;

determine whether the first difference is greater than a first threshold;

use the second luminance value as the fused luminance value when the first difference is less than or equal to the first threshold; and add a second difference to the first luminance value to obtain the fused luminance value when the first difference is greater than the first threshold and when the first luminance value is less than the second luminance value, wherein the second difference is based on the second luminance value.

19. The computer program product of claim 14, wherein the instructions, when executed by the one or more processors, further cause the terminal to:

obtain a first difference between the first luminance value and the second luminance value;

determine whether the first difference is greater than a first threshold;

use the second luminance value as the fused luminance value when the first difference is less than or equal to the first threshold; and subtract a second difference from the first luminance value to obtain the fused luminance value when the first difference is greater than the first threshold and when the first luminance value is greater than the second luminance value, wherein the second difference is based on the second luminance value.

20. The computer program product of claim 14, wherein the instructions, when executed by the one or more processors, further cause the terminal to obtain the second luminance value at the preset second angle of view, and wherein the preset second angle of view is one time a focal length of the camera lens.

* * * * *